US006981438B1

(12) United States Patent  (10) Patent No.: US 6,981,438 B1
Albert et al.  (45) Date of Patent: Jan. 3, 2006

(54) HYDRAULIC BRAKE BOOSTER

(75) Inventors: Timothy Jay Albert, Niles, MI (US); Robert K. Wilson, Galine, MI (US)

(73) Assignee: Robert Bosch Corporation, Broadview, IL (US)

( * ) Notice: Subject to any disclaimer, the term of this patent is extended or adjusted under 35 U.S.C. 154(b) by 203 days.

(21) Appl. No.: 10/767,300

(22) Filed: Jan. 29, 2004

(51) Int. Cl.
*F15B 13/10* (2006.01)
*F15B 13/16* (2006.01)

(52) U.S. Cl. .................................. 91/367; 60/547.1
(58) Field of Classification Search .............. 60/547.1, 60/555; 91/367, 374, 382, 453, 457
See application file for complete search history.

(56) References Cited

U.S. PATENT DOCUMENTS

| 4,117,766 | A | * | 10/1978 | Kervagoret .............. 91/391 R |
| 4,281,585 | A | | 8/1981 | Runkle |
| 4,539,892 | A | | 9/1985 | Mackiewicz |
| 4,625,515 | A | | 12/1986 | Myers et al. |
| 6,561,596 | B2 | | 5/2003 | Penninger |

\* cited by examiner

*Primary Examiner*—F. Daniel Lopez
(74) *Attorney, Agent, or Firm*—Leo H McCormick, Jr.; Warren Comstock

(57) ABSTRACT

A hydraulic brake booster has an actuator arrangement for a control valve that includes a ball that is located in a first sleeve retained in a stepped bore of a cylindrical member and a pin that is retained in the cylindrical member. The pin has a first end that is located in an actuation chamber and is connected with a first input member and a second end that extends into the stepped bore to engage the ball. The first end on receipt of a first input force initially moves the pin and ball from a position of rest to interrupt fluid communication between the actuation chamber and a reservoir and thereafter moves the sleeve to selectively initiate metered communication of pressurized fluid to the actuation chamber that acts on a first piston to effect a first brake application of a wheel brake. A second sleeve that surrounds the pin has a lip on a first end that engages the cylindrical member to position a second end thereon in an auxiliary actuation chamber within the housing of the brake booster. The second sleeve responds to a second input force derived from pressurized fluid being presented to the auxiliary actuation chamber as a function of a second input by acting on the second end of the second sleeve to move the first end into engagement with the ball and move the ball from a position of rest to interrupt fluid communication between the actuation chamber and the reservoir and thereafter move the first sleeve to communication of pressurized fluid to the actuation chamber that acts on the first piston as a function of the second input to independently effect a second brake application of a wheel brake.

7 Claims, 6 Drawing Sheets

HYDRAULIC BRAKE BOOSTER

This invention relates to an actuator arrangement for use in a brake booster having several modes of actuation including a manual mode, a power assist mode and a electronic mode for developing an output force corresponding to a desired brake application.

BACKGROUND OF THE INVENTION

In hydraulic brake boosters of a type disclosed in U.S. Pat. Nos. 4,281,585; 4,539,892; 4,625,515; 6,561,596 and U.S. application Ser. No. 10/307,791 filed Dec. 2, 2002, a control valve is located in a first bore and a power piston is located in a second bore of a housing. A lever arrangement is connected to the power piston and the control valve. An input force applied to a brake pedal by an operator acts on the lever arrangement to develop a manual mode and a power assist mode of operation. The lever arrangement pivots on the power piston and communicates an actuation force that moves the control valve to regulate the flow of pressurize fluid from a source to an operational chamber. The regulated pressurized fluid supplied to the operational chamber acts on the power piston to develop an operational force that pressurizes fluid in the first bore that is supplied to wheel brakes to effect a corresponding brake application. A reaction force produced by regulated pressurized fluid in the movement of the power piston is transmitted back to the brake pedal to balance the input force such that the operational force supplied to move the power piston in the first bore is a linear function of the input force applied to the brake pedal.

Additional features such as traction control, dynamic operational control and anti-skid control under the control of an ECU have been added to hydraulic brake booster to provide a total brake system. Unfortunately in some brake systems, during an ECU generated brake application, the brake pedal of the hydraulic booster mirrored the movement of the power piston. One way to hold a brake pedal stationary during an ECU generated brake application is disclosed by the structure in U.S. Pat. No. 6,203,119 wherein a control valve seat moves to meter pressurize fluid while in U.S. patent application Ser. No. 10/307,791 a separate piston is provided to act on the control valve to meter pressurized fluid to effect a brake application.

SUMMARY OF THE INVENTION

A primary object of the present invention is to provide an actuator arrangement having a control valve in a first mode of operation that is actuated by a first input force applied to a pin through a lever connected to a brake pedal to meter pressurized fluid to a actuation chamber to effect a first brake application and in a second mode of operation wherein a sleeve that surrounds the pin that is actuated by a second input force derived from pressurized fluid under the control of an ECU to meter pressurized fluid to the actuation chamber while at the same time a limited quantity of the pressurized fluid under the control of the ECU is supplied to the actuation chamber that immediately acts on a power piston is combined with the metered pressurized fluid to initiate the development of a second brake application.

According to this invention, the hydraulic brake booster for use in a brake system has a housing with a first bore therein for retaining a power piston, a second bore therein for retaining a control valve and an actuation chamber. The second bore is connected to a source of pressurized fluid, a reservoir and the actuation chamber. The control valve including a first cylindrical member and a second cylindrical member that are retained in the second bore. The first and second cylindrical members act as a unit to define a stepped axial bore that extends from a first end to a second end. A movable sleeve is located in the stepped bore to control communication between an inlet port, a supply port and a relief port in the housing. An actuator arrangement connected to a lever that receives an input force from a brake pedal includes a ball that is located in the stepped bore and a pin that is retained in the second cylindrical member. The pin has a first end that is located in the actuation chamber and is connected with the lever and a second end that extends into the stepped bore to engage the ball. The first end on receipt of a first input force initially moves said pin and ball from a position of rest to interrupt fluid communication between the actuation chamber and the reservoir through the relief port and thereafter moves the first sleeve to sequentially initiate metered communication of pressurized fluid presented to the inlet port to the actuation chamber. The metered pressurized fluid acts on the first piston as a function of the first input force applied to the brake pedal to effect a first brake application of a wheel brake. When the first input force action on the brake pedal terminates the pin and ball return to the position of rest and the actuation chamber is again in communication with the reservoir. The actuator arrangement is further characterized by a second sleeve that surrounds the pin with a lip on a first end that engages the second cylindrical member to position a second end thereof in communication with an auxiliary actuation chamber in defined in the housing within the second cylindrical member. The second sleeve responds to a second input force derived from pressurized fluid being presented to the auxiliary actuation chamber under the control of the ECU to develop a second input force that acts on the second end of the second sleeve to move the first end of the sleeve into engagement with the ball and move the ball from the position of rest to interrupt fluid communication between the actuation chamber and the reservoir through the relief port and thereafter move the first sleeve to selectively initiate metered communication of pressurized fluid presented to the inlet port to the actuation chamber that acts on the first piston as a function of the second input under the control of the ECU while at the same time a limited quantity of pressurized fluid under the control of the ECU is diverted from the being presented to the auxiliary actuation chamber is directly presented to the actuation chamber to initiate the development of a second brake application of a wheel brake. On termination of the second input force, the ball returns to the position of rest while the second sleeve returns to engagement with the second cylindrical member.

An advantage of this invention resides in an actuator arrangement having a first mode of actuation under the control of an operator wherein a control valve is activated to meter pressurized fluid to an actuation chamber and effect a first brake application and having a second mode of actuation under the control of an ECU wherein pressurized fluid received by an auxiliary actuation chamber acts on a sleeve to activate the control valve to meter pressurized fluid to the actuation chamber while at the same time pressurized fluid that is directly supplied to an actuation chamber to initiate the development is sequentially combined with the metered pressurized fluid to effect a second brake application.

A further advantage of this invention resides in an actuator arrangement whereby a first input force corresponding to an operator brake request effects a first brake application or a second input force derived from an ECU request activates a control valve to meter pressurized fluid that is combined with restricted pressurized fluid to act on a power piston to pressurize fluid that is communicated to wheel brakes in a vehicle to effect a second brake application.

DETAILED DESCRIPTION OF THE INVENTION

Figure 1:
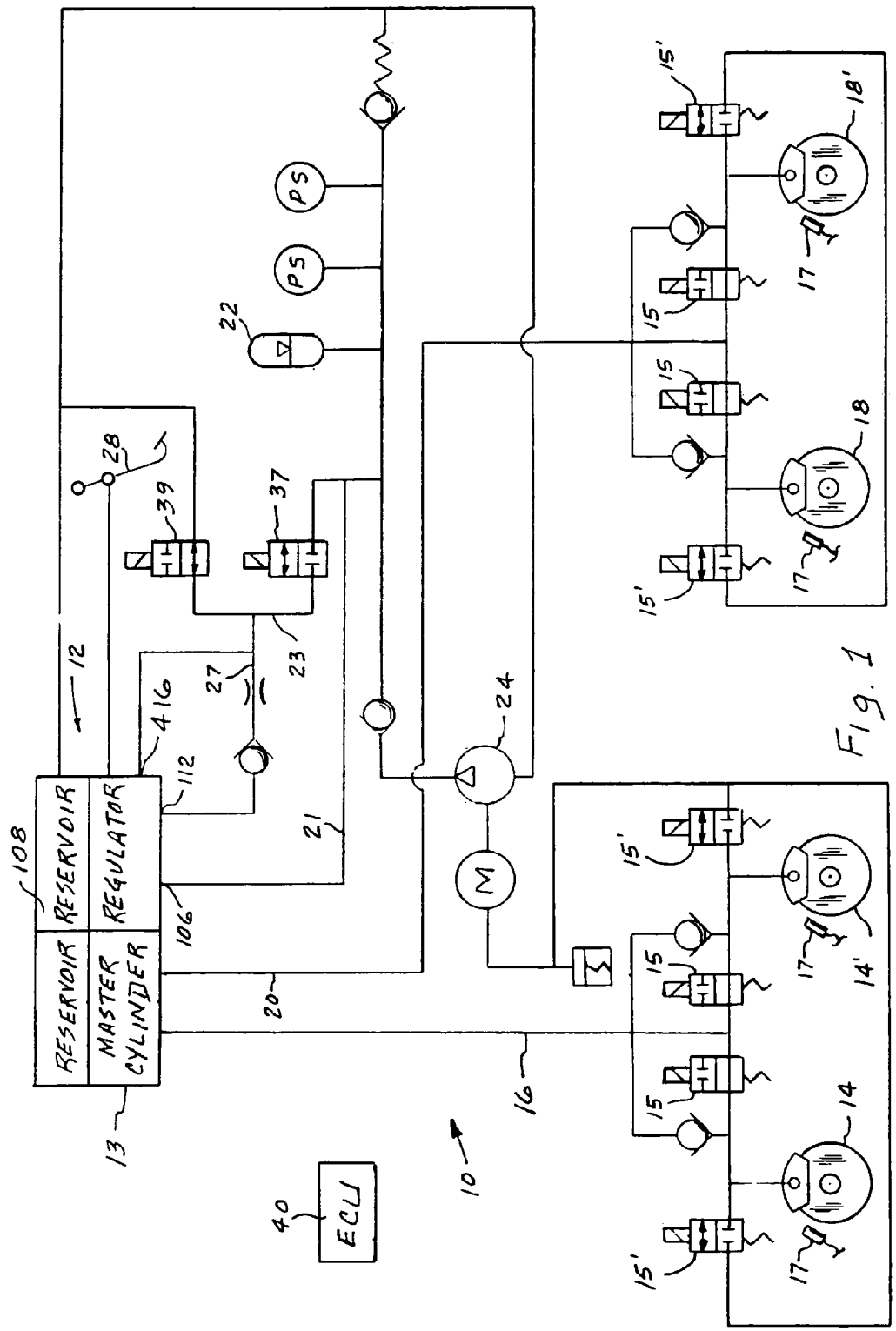
FIG. 1 is a schematic illustration of a brake system that includes a hydraulic brake booster with an actuator arrangement made according to the principals of the present invention.

The brake system 10 as shown in FIG. 1 includes a hydraulic brake booster 12 for supplying a master cylinder 13 with an operational force to pressurized fluid that is thereafter supplied to a first set of wheel brakes 14,14' by a first conduit 16 and to a second set of wheel brakes 18,18' by a second conduit 20 to effect a brake application. The hydraulic brake booster 12, which is commonly referred to as a closed center booster, receives pressurized supply fluid a source, either directly from a pump 24 or an accumulator 22 that is charged and maintained to a predetermined fluid pressure level by pump 24.

The brake booster 12 may function in several modes of operation including a manual mode, a boost mode, a boost plus manual mode all of which are under the control of an operator or an electronic mode that is under the control of an ECU 40. In the manual mode, a brake force from an operator is transmitted directly from the brake pedal 28 to act on the pistons in the master cylinder 13, in the boost plus manual mode, once hydraulic run out is reached a manual input is added to the output force developed from the pressurized fluid of the boost mode to effect a brake application and in the electronic mode the ECU activates first 37 and second 39 solenoid valves to sequentially terminate communication between an actuation chamber 80 and a reservoir 108 and initiate communication of pressurized fluid that acts on the control valve 60 to meter pressurized fluid from a source that is simultaneously supplied to an auxiliary actuation chamber 81 and the actuation chamber 80. The pressurized fluid supplied to the actuation chamber 80 is restricted and acts on the power piston 50 to initiate the development of an output force while the pressurized fluid in the auxiliary actuation chamber 80' acts on the control valve 60 to metered pressurized fluid that acts power piston 50 to develop an output force that corresponds to a braking force derived by the ECU 40 to meet desired operational activities of a vehicle.

In the manual or first mode, the development of a hydraulic actuation force in brake booster 12 is under the control of an operator. The operator applies a brake force to the brake pedal 28 corresponding to a desired braking event, and this brake force is communicated through a lever arrangement 200 to activate the control valve 60. When activated, the control valve 60 meters pressurized fluid that is supplied to the actuation chamber 80 to develop a corresponding actuation force on the power piston 50 as illustrated in FIG. 3 for moving pistons in the master cylinder 13 and pressurized fluid in the master cylinder 13 that is supplied to operate wheel brakes 14,14' and wheel brakes 18,18' and effect a brake application. On termination of the brake force by the operator to brake pedal 28, the components of the brake booster 12 are returned to a rest state as illustrated in FIG. 2.

In the electronic mode, the brake system 10 is under the control of the ECU 40. The ECU is connected to the following components in the brake system: a build solenoid valve 15; a decay solenoid valve 15'; and a wheel speed sensor 17 for each wheel in the first set of wheel brakes 14,14' and second set of wheel brakes 18,18'. Each of the wheel speed sensors 17 provide the electronic control unit (ECU) 40 with an input signal relating to a current functional operational of a particular wheel of the vehicle and are evaluated other inputs and data relating to the vehicle including but not limited to: the operation of the motor pump; the pressure of the pressurized supply fluid; dynamic forces experienced by the vehicle; accumulator fluid supply pressure, the level of fluid in a reservoir and etc. that may effect the safe operation of the vehicle and the ability of achieving a desired braking application. If the ECU 40 determines after evaluating the inputs relating to the operational features or conditions currently experienced by the vehicle that a less than optimum operation situation is occurring or forthcoming, the ECU 40 is programmed institute independent braking of the wheel brakes 14, 14' and 18,18' by transmitting an operating signal that closes normally opened solenoid valve 37 to reservoir 108 and open normally closed solenoid valve 39. When solenoid valve 39 is opened pressurized hydraulic fluid flows from the accumulator 22 and to activate a hydraulic actuator 400 and directly activate the control valve 60 of the hydraulic brake booster 12 and at the same time a restricted quantity of pressurized fluid flows to actuation chamber 80. Once control valve 60 is activated, pressurized hydraulic fluid is communicated to actuation chamber 80 and acts on the power piston 50 to create an operational force that in turn acts on pistons in the master cylinder 13 to produce pressurized fluid that is supplied to individually activate the wheel brakes 14, 14' and 18,18' in accordance with signals from the ECU 40 to effect a brake application and attenuate the less than optimum operating condition which could effect the safe operation of the vehicle.

Figure 2:
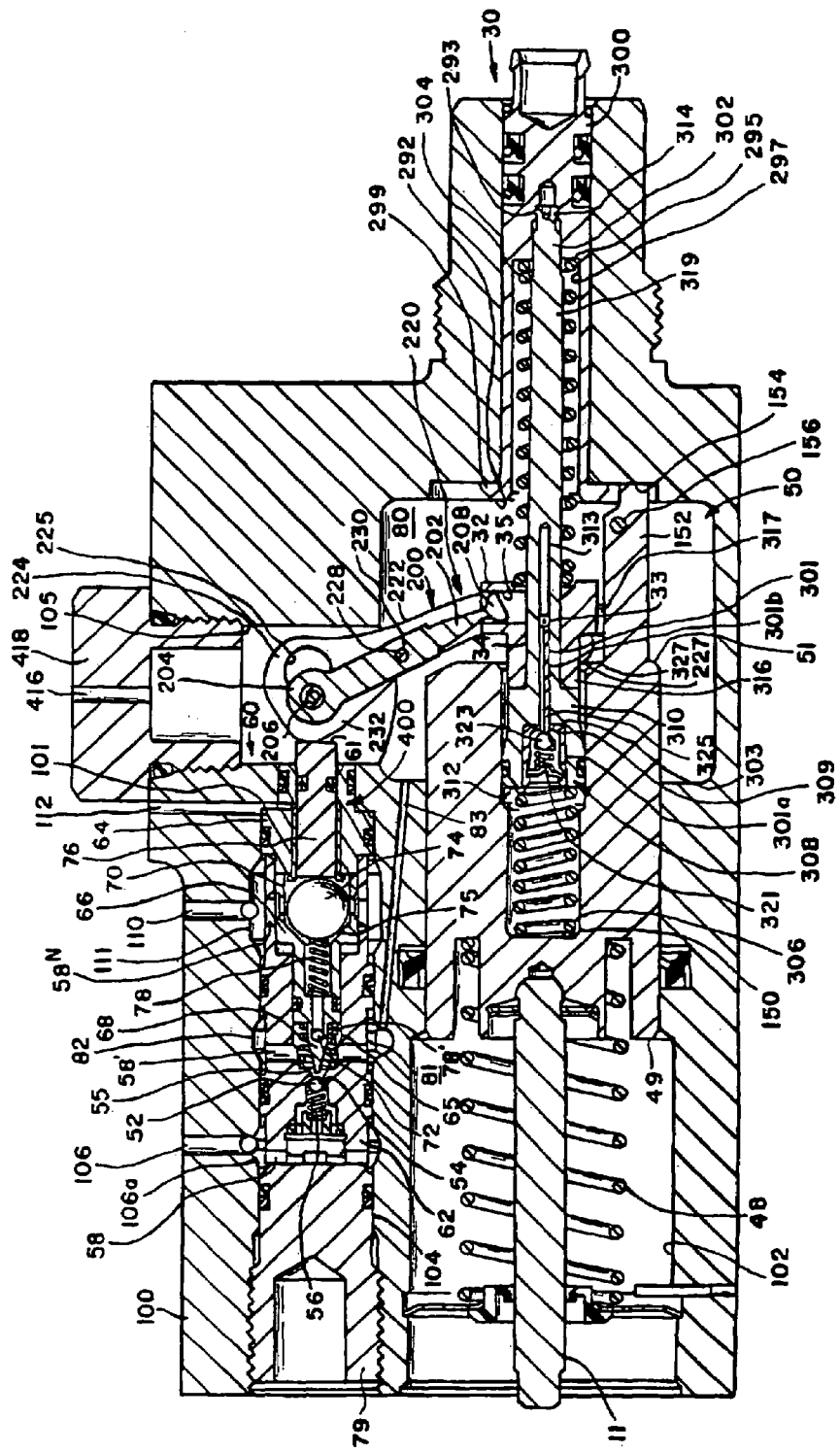
FIG. 2 is a sectional view of the hydraulic brake booster of FIG. 1 in a rest condition.
Figure 3:
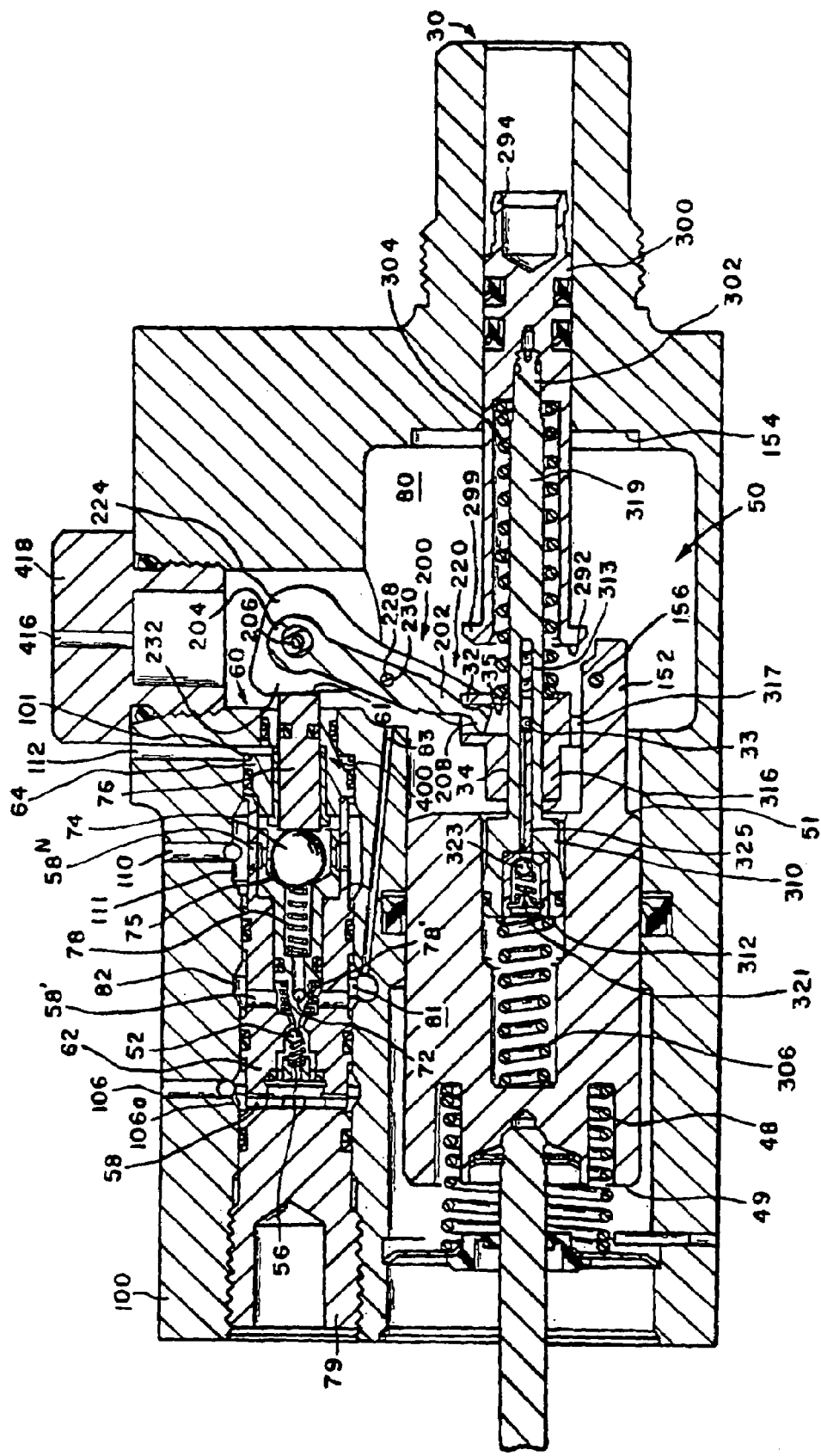
FIG. 3 is a sectional view of the hydraulic brake booster of FIG. 2 in an actuation condition corresponding to a first mode of operation under the control of an operator to effect a brake application.

The hydraulic brake booster 12 is best illustrated in FIG. 2 and with the exception of actuator 400 is similar to the structure disclosed in U.S. patent application Ser. No. 10/307,791. The brake booster includes a housing 100 with a power piston 50 that is sealingly retained in a first bore 102 and a control valve 60 that is sealingly retained in a second bore 104 therein with an input member 30 connected to the power piston 50 and linked to the control valve 60 by the lever arrangement 200. In the boost or first mode, the lever arrangement 200 is responsive to a braking input force that is communicated from a brake pedal 28 to the input member 30 for moving the control valve 60 that meters pressurized fluid from a source, either pump 24 or accumulator 22. The metered pressurized fluid is communicated to a actuation chamber 80 in housing 100 and acts on the power piston 50 to develop a hydraulic actuation force that in turn acts on piston in the master cylinder 13 to pressurize fluid therein that is communicated to the wheel brakes wheel brakes 14, 14' and 18,18' in a brake system 10 for effecting a corresponding brake application.

In more particular detail, the housing 100 includes a first inlet port 106 connected to supply conduit 21 for receiving pressurized hydraulic fluid either directly from pump 24 or from accumulator 22; a relief port 110 connected to a common reservoir 108 for pump 24 and master cylinder 13 and a second inlet port 112 that is connected to supply conduit 21 by conduit 23 through a normally closed solenoid valve 39 under the control of ECU 40 or a normally opened solenoid valve 37 connected to the common reservoir 108. The housing 100 has a stepped first bore 102 that extends clear through the housing 100, a stepped second bore 104 that is parallel with the first bore 102 and extends into the housing 100 from a first side until it intersects with a cross bore 105 that extends from the actuation chamber 80. Housing 100 has a first groove 106a through which first inlet 106 is connected to the second bore 104, a second groove 111 through which the second bore 104 is connected to the reservoir 108 and a third groove 82 through which the second bore 104 is connected by passage 83 to the actuation chamber 80 and a fourth groove 113 through which passage 112 is selectively connected to reservoir 108 and the source of pressurized fluid.

The control valve 60 includes a first cylindrical body 62 and a second cylindrical body 64 that are sealingly located the second bore 104. An end plug 79 that is fastened by being screwed into housing 100 holds the second cylindrical body 64 against a shoulder 101 in the housing 100- to correspondingly align radial passages 58,58' . . . . 58" that extend from a stepped bore 65 in the first cylindrical body 62 with groove 106a and inlet port 106, with groove 82 and control passage 83 and with groove 111 and relief port 110 and end 63 of the second cylindrical body 64 with groove 113 and passage 112. With the second cylindrical body 64 against shoulder 101, an auxiliary actuation chamber 80' is defined within the second cylindrical body 64. The control valve 60 further includes a sleeve 66 that is concentrically located within bore 65 of the first cylindrical body 62. Sleeve 66 has an integral axial projection 68 that functions as a needle valve within the stepped bore 65 of the first cylindrical body 62. The sleeve 66 in turn has a stepped axial bore 70 that terminates in a cross bore 72 adjacent the axial projection 68. Axial bore 70 retains a first ball 74 that is urged into engagement with an actuation pin 76 retained in the second cylindrical body 64 by a first return spring 78 while a second return spring 78' urges the sleeve 66 into engagement with the second cylindrical body 64. The control valve 60 further includes a second ball 52 that is located in the stepped bore 65 and urged toward a seat 54 formed on land 55 by a spring 56. Land 55, radial passage 58', groove 82 and the end of sleeve 66 define a volume that functions as a supply chamber 81 for supply conduit 83. When spring 56 urges ball 52 against seat 54, communication between inlet port 106 and passage 83 is inhibited while at the same time communication between relief port 110 and actuation chamber 80 is uninhibited by way of passage 83, cross bore 72, axial bore 70 as return spring 78 urges ball 74 away from seat 75 in sleeve 66.

The power piston 50 is sealingly located in the first bore 102 and urged toward a rest position in the actuation chamber 80 by a return spring 48. A bracket 32 that straddles a projection 152 that extend from the power piston is retained thereon by a pin 33 that passes through an axial slot 313 in a shaft 302 on the input member 30.

The input member 30 includes; a cylindrical body 300 that is sealingly located in the first bore 102; a shaft 302 that is connected to the cylindrical body 300 connected to push rod 29 and located in bore 306 within the power piston 50; a first spring 304 that is concentric to the shaft 302; a bracket 32 that is carried on shaft 302; a second or return spring 306 that acts on shaft 302 to urges the cylindrical body 300 toward a position of rest; and a ball valve assembly 308.

The bracket 32 has a general rectangular shaped base with an axial bore 34 for receiving shaft 302 and a radial opening 35 that is retained in perpendicular plane with respect to projection 152 by a pin 33 that extends though a slot 313 in shaft 302. Bracket 32 is capable of axial movement on shaft 302 through which an input force is applied to the end 208 of lever 202 in lever arrangement 200 along a radial plane with respect to the axis of the first bore 102. When the threaded second end 314 of shaft 302 is screwed into cylindrical body 300, spring 304 is compressed and as a result spring 304 provides a force that urges bracket 32 toward and into engagement with head 310.

The lever arrangement 200 includes a first lever 202 and a second lever 220 made up parallel arms 222, (only one is shown). The first lever 202 has a first end 204 that is pivotally secured in housing 100 by a first pivot pin 206 and a second end 208 with a semi-spherical surface thereon that is located in the radial opening 35 of bracket 32. The parallel arms 222 of the second lever 220 each have a first end 224 and a second end with the first pin 206 passing through an elongated oval slot 225 in the first end 224 and the second end being aligned with the end face 51 on the power piston 50. The second lever 220 is connected to the first lever 202 by a second pivot pin 228 that sequentially extends through the first arm 222, first lever 202 and second arm 222' at a fulcrum point 230 on the first lever 202. The first end 224 of the parallel arms 222 have a cam surface 232 that engages face 61 on actuation pin 76 of the control valve 60 at a point contact while the second end of the parallel arms 222 have an arcuate surface that define a point contact with the end face 51 of piston 50 such that return spring 306 transmits a force through bracket 32 to end 208 of the first lever 202 to hold the cam surface 232 against face 61 and the arcuate surface on the second end of lever 220 against the end face 51 on the power piston 50. The fulcrum point 230 on lever 202 is selected such that as lever 202 pivots in an arc about pivot pin 206, an actuation force applied to the second lever 220 is balanced between the first end 224 and the second end.

The lever arrangement 200 has a first length defined by a distance between the first pin 206 and the second end 208 on the first lever 202 and a second length defined by a distance between the first pin 206 and the second end of the second lever 220 such that the axial movement of the cylindrical body 300 and the power piston 50 is defined by a ratio of the first length to the second length. Thus, a hydraulic output force developed by metered pressurized fluid presented to the actuation chamber 80 by way of the control valve is proportional to an input force applied to brake pedal 28.

The brake booster 12 includes a hydraulic actuator 400 as best illustrated in FIGS. 4,5,6 and 7 under the control of the ECU 40 to achieve an electronic mode of operation. Hydraulic actuator 400 includes a second sleeve 402 that surrounds pin 76 with a lip 404 on a first end 406 that engages shoulder 65 on the second cylindrical member 64 to position a second end 408 thereof in auxiliary actuation chamber 80' located in the second cylindrical member 64. The hydraulic actuator 400 further includes a restrictive orifice or bleed 410 that is located in conduit 27 that is connected to lead 23 through which solenoid valve 39 is connected to passage 112 and a one-way check valve 412 located between the orifice 410 and a port 416 in access port cap 418 for chamber 80 in housing 100. The one-way check valve 412 in conduit 27 is such that communication of fluid pressure between actuation chamber 80 and reservoir 108 is inhibited and as a result functional operation in an electronic mode is strictly under the control of ECU 40.

Operation of the Brake Booster

For a given vehicle, the operational force developed by an input force applied to a brake booster to meet operational braking parameters is effected by several factors including weight of the vehicle, size of the power piston in the brake booster and the available hydraulic fluid pressure developed by a source. Only after the parameters have been defined are the component parts that make up a brake system selected. For instance in a brake system equipt with a hydraulic brake booster 12, a gain or ratio is selected to define a relationship between the input force applied to the brake pedal 28 by an operator and the operational force developed by metering pressurized fluid to the actuation chamber 80 to act on a power piston 50. In the lever arrangement 200 for brake booster 12, the location of the fulcrum point 230 on the first lever 202 is selected such a balanced force is applied to the first 224 and second ends of the second lever 220 and in activating the control valve 60 to meter pressurized fluid to the actuation chamber 80. In this brake booster 12, the resulting hydraulic force applied to the power piston 50 is proportional to the input force applied by an operator to the input member 30 to effect a brake application.

In more detail, when an operator desires to effect a brake application in a vehicle having a hydraulic brake booster 12 as shown in FIG. 2, an input force applied to brake pedal 28 that is communicated through input push rod 29 to move input member 30 that includes the cylindrical body 300, head 310 on stem 302 and bracket 32 all of which move in a direction toward power piston 50. Movement of the bracket 32 causes that end 208 of lever 202 to pivot about pin 206 and impart an actuation force through pin 228 at fulcrum 230. The actuation force at pin 228 is applied to the second lever 220 and applied through arms 222 such that one half of the actuation force is applied to end or face 61 on actuation pin 76 by way of cam surface 232 and the other half is applied to the end face 51 of the power piston 50 through the second end of the second lever 220. The actuation force applied to pin 76 initially moves ball 74 into engagement with seat 75 to close communication between chamber 81 and relief port 110 by way of cross bore 72 and bore 70, as shown in FIG. 3. Further movement of the actuation pin 76 now moves the first sleeve 66 such that axial projection 68 engages ball 72 and moves ball 52 off seat 54 to allow metered pressurized supply fluid to flow into chamber 81 and be communicated through passage 83 into actuation chamber 80. The metered pressurized supply fluid in chamber 80 acts on the second end 51 of piston 50 and creates an operational force that is communicated through output push rod 11 to act on pistons in the master cylinder 13 and correspondingly pressurize fluid therein that is supplied through conduits 16 and 20 to effect a brake application in wheel brakes 14,14' and 18,18'. On termination of the input force to brake pedal 28, the component are returned to the positions shown in FIG. 2 to communicate the actuation chamber 80 to the reservoir 108.

When hydraulic run out for brake booster 12 occurs, ball 52 in control valve 60 is completely off seat 54 and the lever arrangement 200 is aligned such that bracket 34 separates from head 310. However, further operational output force can now be achieved as an input force applied to cylindrical body 300 is directly transferred into power piston 50 and added to the output force produced by the pressurized fluid in actuation chamber 80 to produce an output force based on boost mode plus manual mode.

In event that the pressurized fluid from the supply is unavailable, the brake booster 12 is under a manual control mode. An input force that is applied to brake pedal 28 can be used to pressurize the pistons in master cylinder 13. An input force applied to input member 30 moves the cylindrical member 300 and bracket 32 associated therewith such that end 208 of lever 202 pivots on pin 206 and imparts an actuation force through pin 228 to the second lever 220 to activate the control valve 60. As in a power assist, the actuation force is communicated through cam surface 232 into end 61 of the actuation pin 76 and the actuation pin 76 moves to close relief port 110 by seating ball 74 on seat 75 and moves ball 52 off seat 54 to open communication between the source of pressurized fluid available an inlet port 106 and actuation chamber 80. However, since no pressurized supply fluid is available, the input force on input member 30 continues to move cylindrical member 300 and shaft 302 toward power piston 50 and eventually the first lever 202 engages housing 100 such that the bracket 34 thereafter remains stationary and head 310 separates from bracket 34 compress spring 321 and engage power piston 50 to define a direct link between the power piston 50 and input member 30 such that the input force applied to pedal 28 is communicated to push rod 11 to pressurize fluid the master cylinder 13 to effect a brake application.

Figure 4:
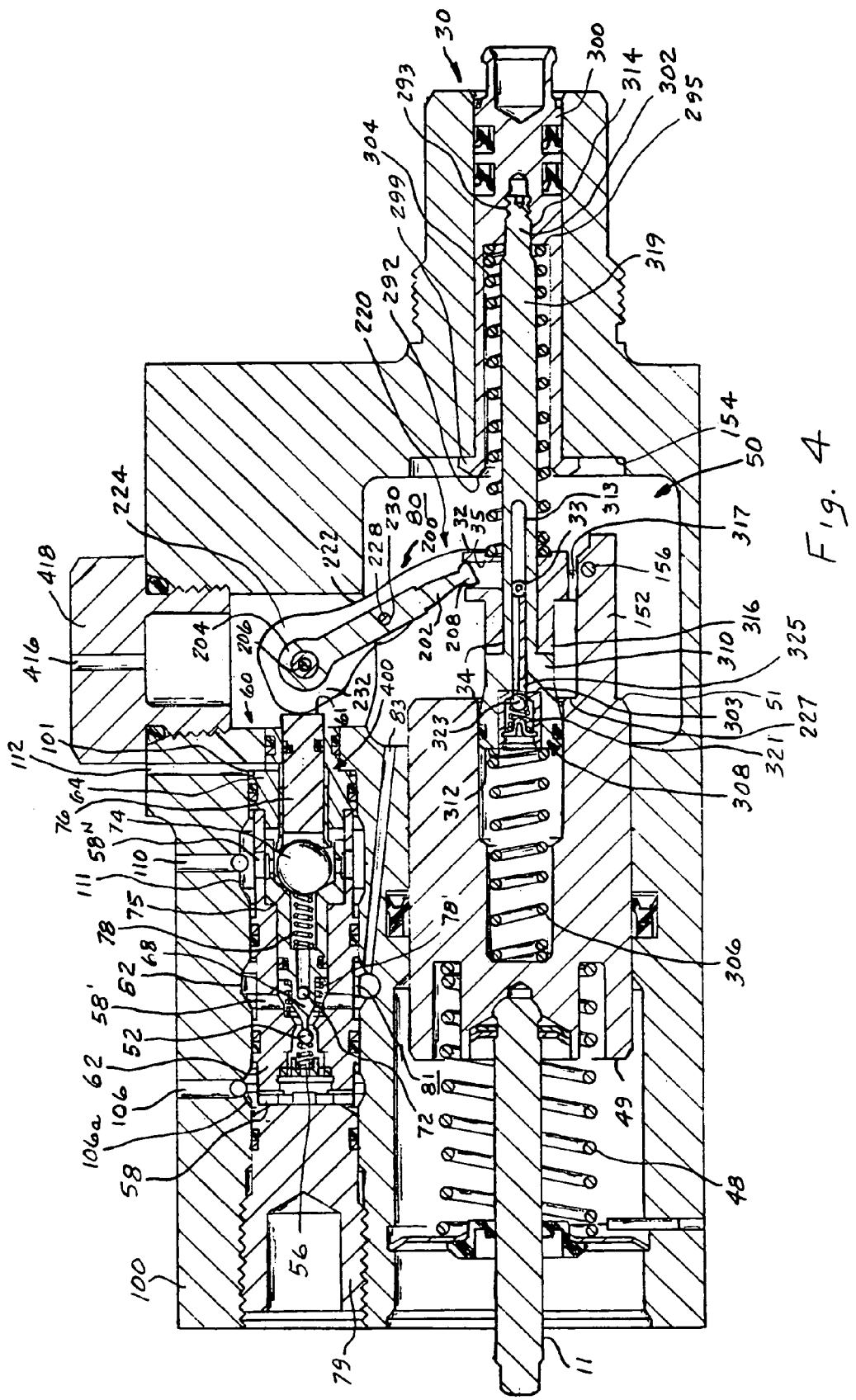
FIG. 4 is a sectional view of the hydraulic brake booster of FIG. 2 in an actuation condition control valve is actuated by an input force derived from pressurized fluid under the control of an ECU is in a build mode to effect a brake application.
Figure 5:
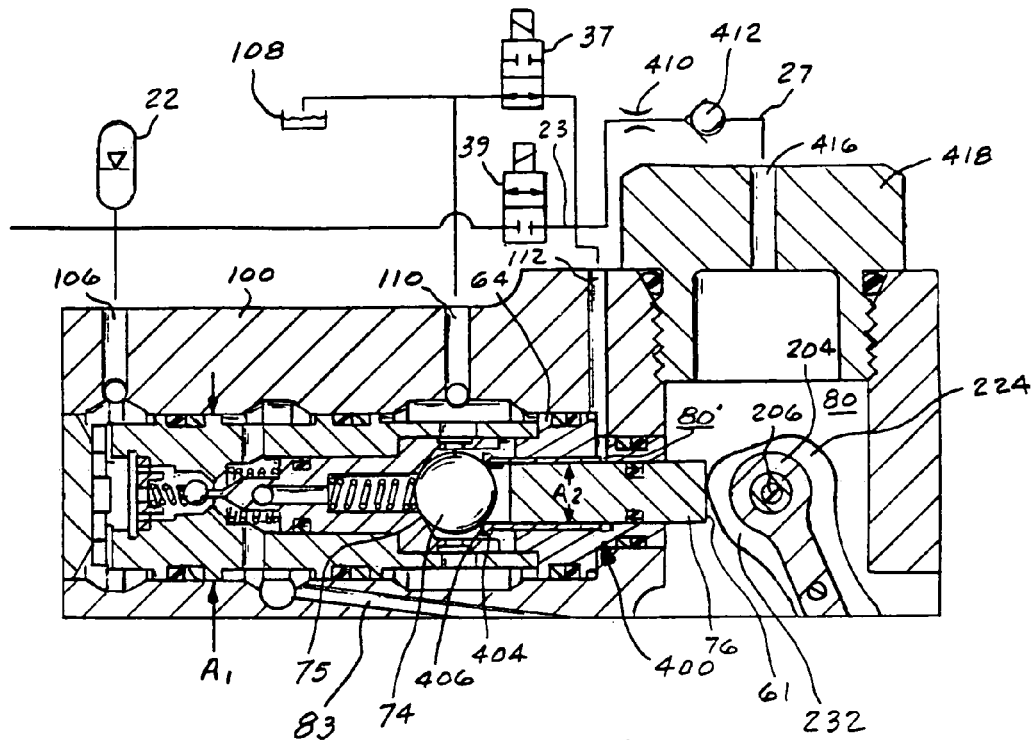
FIG. 5 is sectional view of the circumscribed area 4 of hydraulic brake booster of FIG. 4 in a build condition.
Figure 7:
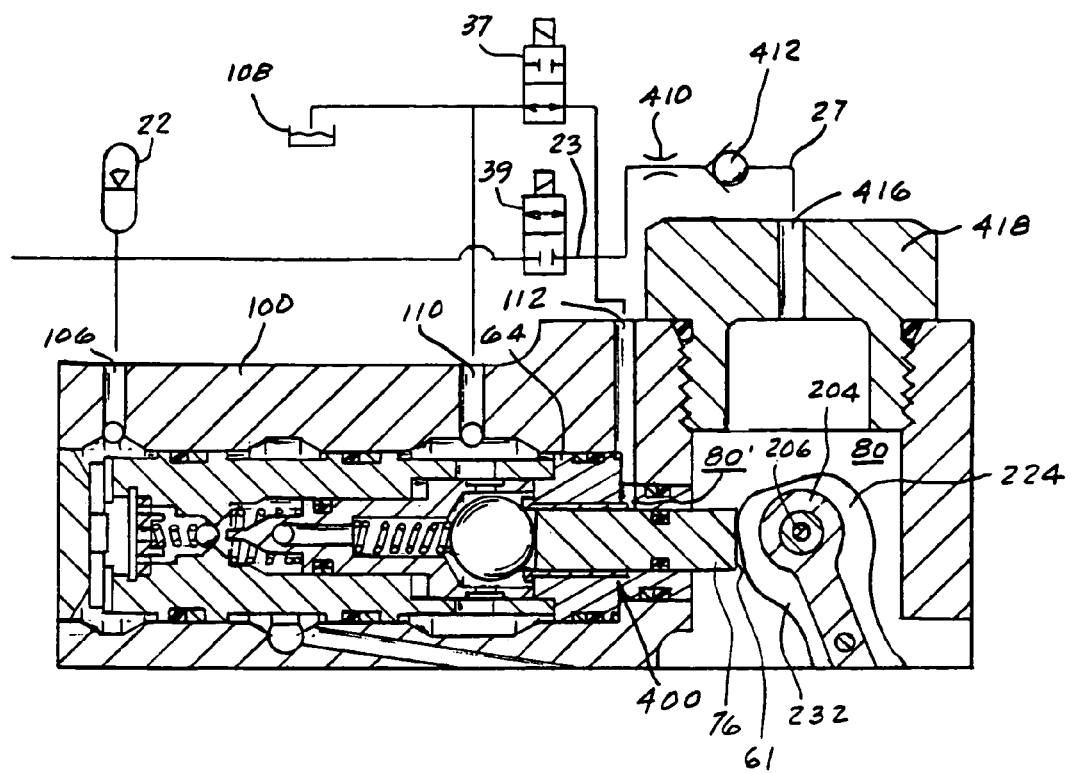
FIG. 7 is a sectional view of the actuator arrangement of FIG. 4 wherein the control valve is in a decay mode in returning to a position of rest as illustrated in FIG. 2.

The hydraulic booster 12 for the brake system 10 also includes an electronic mode under the control of the ECU 40. The ECU 40 has a capability to independently effect a brake application should inputs from the various sensors relating to the operation of the vehicle indicate that a brake application should be performed to meet or maintain desired operating condition for a vehicle. The ECU 40 initiates the electronic mode by the ECU 40 supplying signals that sequentially close the normally opened solenoid valve 37 and open the normally closed solenoid valve 39 as shown in FIGS. 7 and 5, such that supply fluid available in conduit 21 is communicated to auxiliary actuation chamber 80' through passage 112 and to actuation 80 through conduiat 27 by way of restricted orifice 410 and one-way check valve 412. The restricted pressurized fluid communicated through restricted orifice 410 to actuation chamber 80 immediately increases the fluid pressure level in chamber 80 to the restricted fluid pressure level and acts on the power piston 50 to start a second brake application while at the same time the full level of the pressurized fluid communicated to the auxiliary actuation chamber 80' acts on the second end 408 of the second sleeve 402 to move the first end 406 into engagement with ball 74 and move ball 74 from a position of rest against pin 76 into engagement with seat 75 to interrupt fluid communication between actuation chamber 81 and the reservoir 108 through relief port 110 by way of cross bore 72 and bore 70. Further movement of sleeve 402 now moves the first sleeve 66 such that axial projection 68 engages ball 72 and moves ball 52 off seat 54 to allow metered pressurized supply fluid to flow into chamber 81 and be communicated through passage 83 into actuation chamber 80. The metered pressurized supply fluid in chamber 80 is added to the pressurize level of the restricted pressurized fluid therein to act on the second end 51 of piston 50 to create an operational force that is communicated through output push rod 11 to act on pistons in the master cylinder 13 and correspondingly pressurize fluid therein that is supplied through conduits 16 and 20 to effect an independent second brake application in wheel brakes 14,14' and 18,18', as illustrated in FIG. 4.

Once the ECU 40 has determined through the various sensor inputs that the second brake application has achieved a desired result, the signal to solenoid valve 39 is terminated and solenoid valve 39 closed such that fluid pressure of the metered pressurized fluid supplied to actuation chamber 80 by control valve 60 and the fluid pressure of the restricted pressurized fluid supplied to actuation chamber 80 will eventaually equalize and as a result of the metered pressurize fluid acting on $A^1$ of the first sleeve 66 to move the second end 79 of sleeve 66 into engagement with shoulder 65 on the second cylindrical body 64 while at the same time the fluid pressure in actuation chamber 80 acts on pin 76 and the second sleeve 402 to hold ball 74 against seat 75 to prevent communication to the reservoir by way of relief port 110. The fluid pressure in actuation chamber 80 remains constant as the opposing forces on control valve 60 and pin 76 and second sleeve 402 are balanced. This hold mode can be explained by the following relationship:

$$A^1 > A^2 + A^3$$

Where:
$A^1$ is the diameter of the first sleeve 66
$A^2$ is the diameter of seat 75 and
$A^3$ is the diameter of pin 76.

The first sleeve 66 moves toward the second cylindrical body 64 until end 79 engages shoulder 65 and ball 74 remains trapped against seat 75 to maintain a constant braking force.

Figure 6:
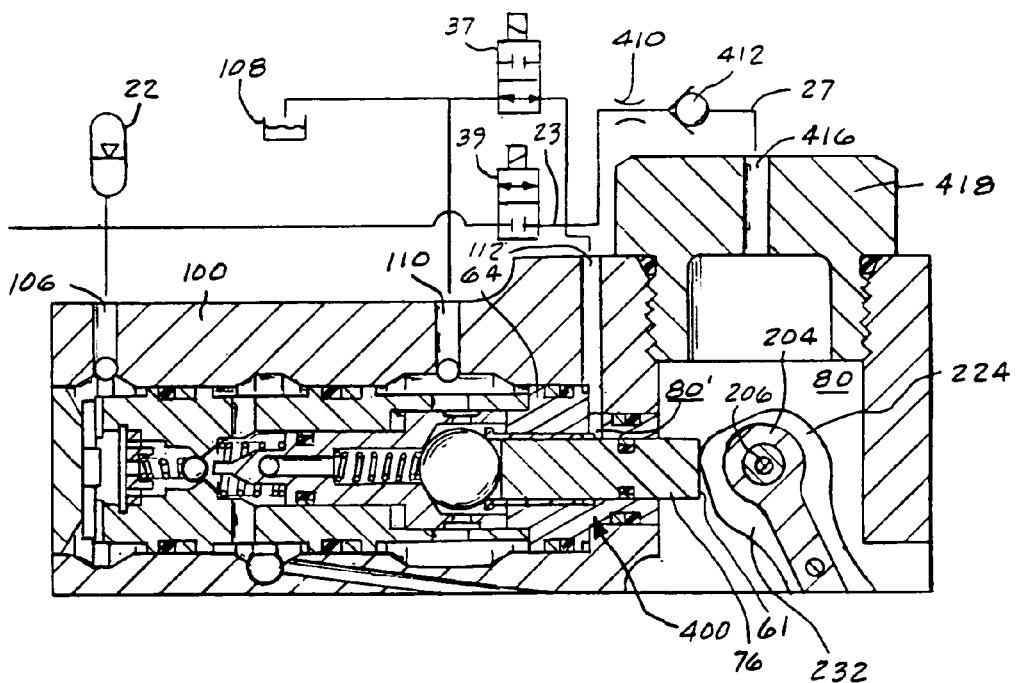
FIG. 6 is a sectional view of the actuator arrangement of FIG. 4 wherein the control valve is in a hold mode of operation.

When the ECU 40 determines a reduction in the fluid pressure in the actuation chamber 80 is desirable to meet a change in operational characteristics, a signal is supplied to maintain solenoid valve 39 in an opened condition while a pulsed signal is supplied to solenoid valve 37 in a selectively allow pressurized fluid supplied to the auxiliary actuation chamber 80' to be communicated to reservoir 108, as illustrated in FIG. 6. When solenoid valve 37 is pulsed the fluid pressure in the auxiliary actuation chamber 80' is reduced and as a result the force acting on end 408 on the second sleeve 402 is correspondingly reduced to allow ball 74 to move away from seat 75 and allow metered pressurized fluid to flow from chamber 81 to reservoir 108 by way of cross bore 72, axial bore 70, radial passage 58, groove 111 and relief port 110 rather than be presented to actuation chamber 80. During the pulsed mode, pin 76 pin remains in a stationary position within the second cylindrical body 64 as pressure across the first end and the second end 61 is substantially balanced and as a result brake pedal 28 remains in a stationary position. After the solenoid valve 37 is pulsed by ECU 40, the ECU 40 may again provide signals to the solenoid valve 37 and 39 to institute the hold mode as describe herein. When the ECU 40 determines that the vehicle is operating in a desired condition without the need for further braking, a signal is provided to solenoid valve 39' to close communication of supply pressurized fluid to conduit 27 and sequentially a signal is provided to solenoid valve 37 to open communication between conduit 27 and reservoir 108. With solenoid valve 37 opened, the fluid pressure in axially actuation chamber 80' rapidly drops such that return spring 78 acts ball 74 to move lip 404 on the second sleeve into engagement with shoulder 65 on the second cylindrical body 64 and pin 76 to a position of rest, as shown in FIGS. 2, and 7 whereby actuation chamber 80 is communicated to reservoir 108 by way of passage 83, cross bore 72, axial bore 70 and relief port 110 as return spring 78 urges ball 74 away from seat 75 in sleeve 66.

We claim:

1. A hydraulic brake booster for use in a brake system having a housing with a first bore for retaining a power piston, a second bore for retaining a control valve and an actuation chamber, said second bore being connected to a source of pressurized fluid, a reservoir and said actuation chamber, said control valve including a first cylindrical member and a second cylindrical member retained in said second bore, said first cylindrical member having a stepped bore that extends there through and a first sleeve located in said stepped bore to control communication between an inlet port, a supply port and a relief port in said housing, an actuator arrangement including a ball located in said stepped bore and a pin retained in said second cylindrical member, said pin having a first end being located in said actuation chamber and connected with a first input member and a second end that extends into said stepped bore to engage said ball, said first end on receipt of a first input force initially moving said pin and ball from a position of rest to interrupt fluid communication between said actuation chamber and said reservoir through said relief port and thereafter moving said first sleeve to selectively initiate communication of pressurized fluid presented to said inlet port to said actuation chamber that acts on said first piston as a function of said first input force to effect a first brake application of a wheel brake, said pin and ball returning to said position of rest on termination of said first input force, said actuator arrangement being further characterized by a second sleeve that surrounds said pin with a lip on a first end that engages said second cylindrical member to position a second end thereof in an auxiliary actuation chamber in said second cylindrical member, said second sleeve responding to a second input force derived from pressurized fluid being presented to said auxiliary actuation chamber as a function of a second input and acting on said second end of said second sleeve to move said first end into engagement with said ball and move said ball from a position of rest to interrupt fluid communication between said actuation chamber and said reservoir through said relief port and thereafter moving said first sleeve to selectively initiate communication of pressurized fluid presented to said inlet port to said actuation chamber that acts on said first piston as a function of said second input to independently effect a second brake application of a wheel brake, said ball returning to said position of rest and said second sleeve returning to engagement with said second cylindrical member on termination of said second input force.

2. The hydraulic brake booster as recited in claim 1 wherein said actuator arrangement is further characterized by a first solenoid valve through which said auxiliary actuation chamber is connected to said reservoir and a second solenoid valve through which said auxiliary actuation chamber is connected to said source of pressurized fluid, said second input force being derived by activating said first solenoid to interrupt communication to said reservoir and activating said second solenoid to initiate communication of pressurized fluid to said auxiliary actuation chamber.

3. The hydraulic brake booster as recited in claim 2 wherein said actuator arrangement further includes a restricted flow path through which said second solenoid valve is connected to said actuation chamber, said pressurized fluid being simultaneously communicated to said auxiliary actuation chamber and said actuation chamber to initiate said second brake application of a wheel brake on activation of said second solenoid valve.

4. The hydraulic brake booster as recited in claim 3 wherein said first solenoid valve is modulated to change the level of said pressurized fluid supplied to said auxiliary chamber and correspondingly the intensity of said second brake application.

5. The hydraulic brake booster as recited in claim 4 wherein said restricted flow path includes a one way flow valve to prevent flow communication from said actuation chamber to said auxiliary chamber.

6. The hydraulic brake booster as recited in claim 5 wherein said pin initially remains stationary during movement of said second sleeve such that said first input member also remains in a stationary rest positions.

7. The hydraulic brake booster as recited in claim 4 wherein said first valve is modulated as a function of input signals supplied to an ECU that are derived from sensors that detect the functional conditions of the brake system and corresponding environment.

* * * * *